United States Patent Office 3,364,163
Patented Jan. 16, 1968

3,364,163
PROCESS FOR THE MANUFACTURE OF FORMED ARTICLES FROM POST-CHLORINATED POLYVINYL CHLORIDE CONTAINING THERMOPLASTIC MATERIALS
Bernhard Kraemer and Hans-Ewald Konermann, Oberlar, Germany, assignors to Dynamit Nobel Aktiengesellschaft, Troisdorf, Bezirk Cologne, Germany, a corporation of Germany
No Drawing. Filed Jan. 7, 1965, Ser. No. 424,140
Claims priority, application Germany, Jan. 10, 1964, D 43,321
8 Claims. (Cl. 260—23)

The present invention relates to a process for the manufacture of formed articles from post-chlorinated polyvinyl chloride containing thermoplastic materials and more particularly to a process for the manufacture of formed articles from thermoplastic materials comprising mixtures of post-chlorinated polyvinyl chloride having different chlorine contents. It is known that in the thermoplastic working of post-chlorinated polyvinyl chloride difficulties arise both in regard to the material and in regard to the apparatus, because of the elevated softening temperature or the increased viscosity in the fused state of the post-chlorinated polyvinyl chloride, this being particularly true in connection with the working of the technically important formulations requiring the use of temperatures up to 100° C. The higher temperatures which are required for working thermoplastic materials of this type, even where large amounts of stabilizing agents have been incorporated, result in discoloration and embrittlement, that is, in a partial decomposition of the materials while the same are being worked into the formed products, such as rolled sheeting, plates, extruded shapes, tubing, or the like. When post-chlorinated polyvinyl chloride materials are injection-molded momentary decompositions take place, with the production of gases and back pressure. While it is true that the addition of such agents as lubricants facilitate the processing to some extent, their addition also has a negative effect on the mechanical properties of the resulting products.

Difficulties which arise in connection with the apparatus have to do, in the main, with the fact that the available manufacturing equipment has been designed and installed for use with normal polyvinyl chloride and, therefore, cannot achieve the temperatures, roller shaft bearing pressures, and pumping capacities as are required for the working of post-chlorinated polyvinyl chloride.

It is an object of the present invention to overcome the foregoing drawbacks and to provide a process for the manufacture of post-chlorinated polyvinyl chloride materials suitable for use in the manufacture of formed articles.

It is a further object of the invention to provide a proces of the foregoing type in which the post-chlorinated polyvinyl chloride materials can be worked at temperatures between about 100 and 180° C. depending upon the nature of the ingredients, their proportions, the softening points of the particular post-chlorinated polyvinyl chloride materials used, etc.

Other objects of the present invention will become apparent from a study of the within specification and accompanying examples.

It has been found, in accordance with the invention, that formed articles of post-chlorinated polyvinyl chloride can be manufactured by the working of post-chlorinated polyvinyl chloride by using, as starting materials, mixtures of post-chlorinated polyvinyl chlorides having heterogeneously adjusted chlorine contents averaging between 60 and 70% and which consists of an approximately 5 to 50% mixture of two or more components having a different chlorine content in each instance and, namely, a chlorine content differing from the average chlorine content in the mixture by an amount of from ±0.5 to ±14%. The components of the mixture consisting of polyvinyl chloride having varying degrees of post-chorination are prepared in an aqueous phase using chloroform or carbon tetrachloride as the swelling agent and by introducing chlorine while irradiating the mixture with commercially available ultraviolet lamps. The starting product is suspension polyvinyl chloride.

In the following examples set forth as illustrative of the invention but not limitative thereof, mixtures of polyvinyl chloride are adjusted so as to have a uniform Vicat rating of stability of shape, when heated, amounting to 120° C. In order to exclude any mechanically caused influences that might interfere with a fair comparison of the working qualities, the components were first thoroughly mixed with auxiliary materials consisting of 1% calcium stearate and 3% barium-cadmium laurate (the application of other additives, well suited for the stabilization and plastification of chlorine containing polymers is also possible), and thereafter drawn on a rolling mill into rolled sheets of equal thicknesses using the same drawing velocities. The rolling temperatures amounted to 170° C. and the rolling time to two minutes.

The shinkage was measured in the direction of roll on sheets of 500 mm. original length, after 20 minutes of time in the dryer at 170° C.

The properties of the chlorinated polyvinyl chloride differing in chlorine content and used in the following examples are as follows:

| Components | A | B | C | D |
|---|---|---|---|---|
| Percent Cl | 68.8 | 56.7 | 62.5 | 65.9 |
| Vicat °C | 148 | 85 | 100 | 126 |
| Therm ostability (Din 53381/3) (min.) | 202 | 15 | 58 | 98 |

Example 1

| Components | | Vicat, ° C. | Shrinkage, Percent | Surface |
|---|---|---|---|---|
| A (68.8% Cl), Percent | B (56.7% Cl), Percent | | | |
| 85 | 15 | 120.5 | 16.2 | Rough |

Example 2

| Components | | Vicat, ° C. | Shrinkage, Percent | Surface |
|---|---|---|---|---|
| A (68.8% Cl), Percent | C (62.5% Cl), Percent | | | |
| 70 | 30 | 121.0 | 12.1 | Smooth |

Example 3

| Components | | | |
|---|---|---|---|
| A (68.8% Cl), Percent | C (62.5% Cl), Percent | D (65.9% Cl), Percent | |
| 17.5 | 17.5 | 65 | Vicat: 120.0° C. Shrinkage: 30.7%. Surface: Rough. |

Example 4

|  | Vicat, °C. | Shrinkage, Percent | Surface |
|---|---|---|---|
| D (65.9% Cl) | 119.5 | 40.4 | Very rough. |

As can be seen from Examples 1–3, mixtures of polyvinyl chlorides which have different degrees of post-chlorination result in the production of smoother rolled sheets characterized by the greater absence of shrinkage and tension than that which is obtained from polyvinyl chloride having a uniform degree of post-chlorination.

We claim:

1. Process for the manufacture of formed articles from thermoplastic mixtures based on post-chlorinated polyvinyl chloride, which comprises subjecting a mixture of post-chlorinated polyvinyl chloride having a heterogeneously adjusted chlorine content, the average chlorine value of which lies between about 60 to about 70% and which mixture consists of a first post-chlorinated polyvinyl chloride component present in an amount of from 5 to 50% of said mixture and at least one other post-chlorinated polyvinyl chloride component present in a total amount of 50 to 95% of said mixture, each of said post-chlorinated polyvinyl chloride components having a different chlorine content, the chlorine content of each differing from the average chlorine content of the mixture by a value amounting to from ±0.5 to ±14% to heat and deformation.

2. Process according to claim 1, wherein said mixture of post-chlorinated polyvinyl chlorides additionally contains a lubricant.

3. Process according to claim 1, wherein said mixture of post-chlorinated polyvinyl chloride additionally contains 1% calcium stearate and 3% barium-cadmium laurate.

4. A process for the manufacture of formed articles from thermoplastic mixtures based on post-chlorinated polyvinyl chloride, which comprises subjecting a mixture of 85% of a post-chlorinated polyvinyl chloride having a chlorine content of 68.8% and 15% of a post-chlorinated polyvinyl chloride having a chlorine content of 56.7% to heat and deformation.

5. A process for the manufacture of formed articles from thermoplastic mixtures based on post-chlorinated polyvinyl chloride which comprises subjecting a mixture of 70% of a post-chlorinated polyvinyl chloride having a chlorine content of 68.8% and 30% of a post-chlorinated polyvinyl chloride having a chlorine content of 62.5% to heat and deformation.

6. A process for the manufacture of formed articles from thermoplastic mixtures based on post-chlorinated polyvinyl chloride which comprises subjecting a mixture of 17.5% of a post-chlorinated polyvinyl chloride having a chlorine content of 68.8%, 17.5% of a post-chlorinated polyvinyl chloride having a chlorine content of 62.5% and 65% of a post-chlorinated polyvinyl chloride having a chlorine content of 65.9% to heat and deformation.

7. The process for preventing thermal decomposition of plastic mixtures based on post-chlorinated polyvinyl chloride during working thereof at elevated temperatures, which comprises utilizing said post-chlorinated polyvinyl chloride in the form of a mixture having a heterogeneously adjusted chlorine content, the average chlorine value of which lies between about 60 to about 70% and which mixture consists of a first post-chlorinated polyvinyl chloride component present in an amount of from 5 to 50% of said mixture and at least one other post-chlorinated polyvinyl chloride component present in a total amount of 50 to 95% of said mixture, each of said post-chlorinated polyvinyl chloride components having a different chlorine content, the chlorine content of each differing from the average chlorine content of the mixture by a value amounting to from ±0.5 to ±14%.

8. The composition produced by the process of claim 1.

References Cited

UNITED STATES PATENTS

| | | | |
|---|---|---|---|
| 3,167,598 | 12/1965 | Heaps et al. | 260—879 |
| 2,996,489 | 8/1961 | Dannis et al. | 260—92.8 |
| 3,100,762 | 8/1963 | Shockney | 260—899 |

GEORGE F. LESMES, *Primary Examiner.*

MURRAY TILLMAN, SAMUEL H. BLECH, *Examiners.*

J. WHITE, *Assistant Examiner.*